Feb. 3, 1953 E. H. LAND 2,627,460
SEALED PHOTOGRAPHIC FILM UNIT CONTAINING A LIQUID
Filed May 11, 1950 2 SHEETS—SHEET 1
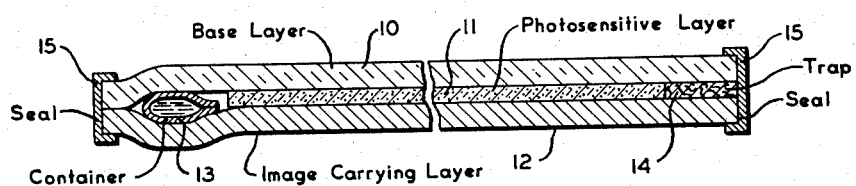
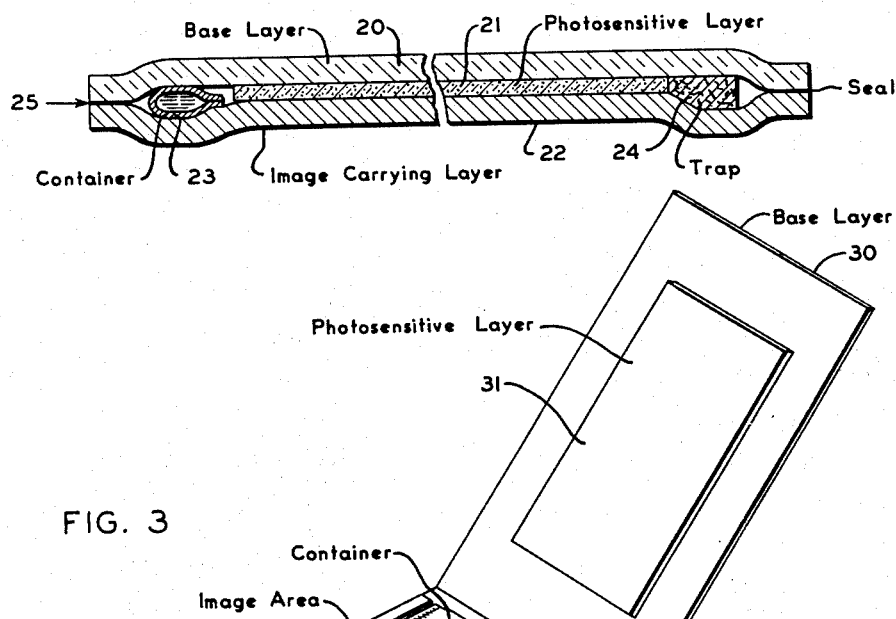
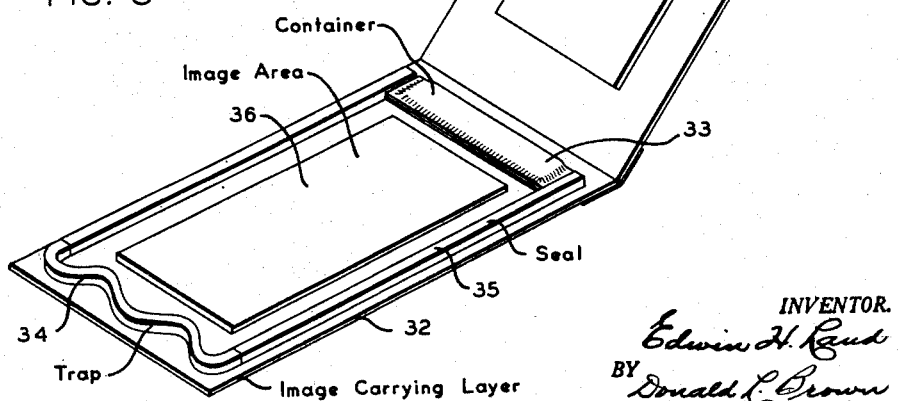
INVENTOR.
Edwin H. Land
BY Donald L. Brown
and
Moncure G. Berg
Attorneys Feb. 3, 1953 E. H. LAND 2,627,460
SEALED PHOTOGRAPHIC FILM UNIT CONTAINING A LIQUID
Filed May 11, 1950 2 SHEETS—SHEET 2

INVENTOR
Edwin H. Land
BY Donald L. Brown
and Moncure B. Berg
ATTORNEYS

Patented Feb. 3, 1953

2,627,460

UNITED STATES PATENT OFFICE 2,627,460

SEALED PHOTOGRAPHIC FILM UNIT
CONTAINING A LIQUID

Edwin H. Land, Cambridge, Mass., assignor to Polaroid Corporation, Cambridge, Mass., a corporation of Delaware Application May 11, 1950, Serial No. 161,414

24 Claims. (Cl. 95—8)

This invention relates to photography and more particularly to novel composite photographic film units.

This application is a continuation-in-part of my copending application Serial No. 641,810, filed January 17, 1946, for Sealed Photographic Film Unit Containing a Liquid, now abandoned.

One object of the present invention is to provide a novel composite photographic film unit which contains therein a liquid composition adapted to develop said film and form therein a positive image, said film being so constructed and sealed as to prevent the egress of any of said liquid composition from said film during processing.

Another object of the present invention is to provide a film of the type described above, wherein there is included, within the sealed area, an additional trap for said liquid composition.

Another object of the present invention is to provide a novel, composite photographic film unit which contains therein a liquid composition adapted to develop said film and form therein a positive image, wherein a portion of said film is adapted to carry a positive image, said portion of the film being separable from the remainder of the film.

Another object of the present invention is to provide a novel composite film unit of the type described above which will permit the escape of air from within said film unit during processing, but which will prevent the escape of any of said liquid composition.

Another object of the present invention is to provide a film of the type described above which will have a uniform thickness and compressibility at each end thereof.

Another object of the present invention is to provide a film of the type described above which will have a uniform thickness and compressibility.

These and other objects of the invention will in part be obvious and will in part appear hereinafter.

For a fuller understanding of the nature and objects of the invention, reference should be had to the following detailed description taken in connection with the accompanying drawings wherein:

Figure 1 is a sectional view of a photographic film embodying the present invention;

Fig. 2 is a sectional view of a film embodying a modification of the present invention;

Fig. 3 is a partially schematic exaggerated view of another modification of the present invention;

Figure 4:
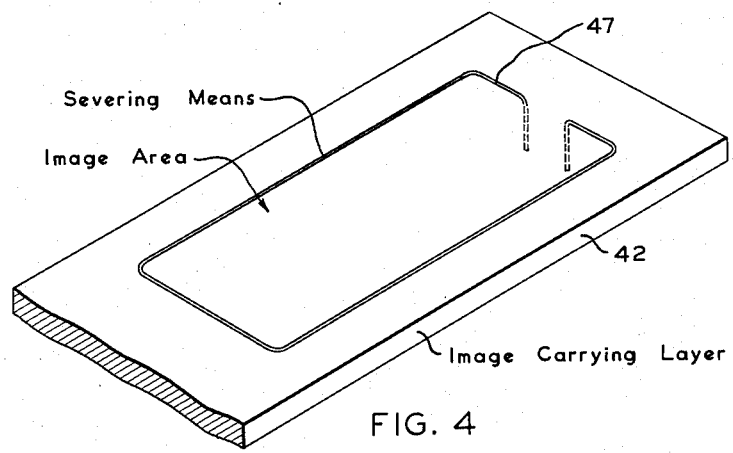
Fig. 4 is a somewhat schematic view of a portion of the image-carrying layer shown in Figs. 1, 2, and 3, embodying another modification of the present invention.

This invention relates generally to the photographic materials and processes described in my copending application 594,892, filed May 21, 1945, for Composite Photographic Product Comprising a Photosensitive Element and a Container Carrying a Liquid for Processing Said Element, now Patent No. 2,609,296.

In one form of the invention described in the above-named application there is shown a photosensitive layer and an image-carrying layer. Between these two layers there is positioned a rupturable container having therein a fluid which I prefer to call a liquid composition. This liquid composition is preferably viscous and preferably contains therein a developer and a film-forming material. The liquid composition also preferably contains a substance which will react with the unexposed portions of the photosensitive layer to form therewith soluble image-forming complexes. When the container is ruptured such as by putting the assembly through a wringer, and the viscous liquid developing composition is spread between the photosensitive layer and the image-carrying layer, it will form an image-receiving layer. This image-receiving layer is created by the action of the film-forming substance which, during the processing of the composite film, is converted from a fluid to a solid. The positive image-forming complexes are transferred from the photosensitive layer to the image-receiving layer where the positive image is formed. In one modification of the above-described invention, the photosensitive layer may be stripped from the image-receiving layer to reveal the finished positive image.

Referring to Fig. 1, there is shown one form of composite film comprehended by the present invention and, as illustrated, said film comprises a base layer 10 adapted to carry thereon the photosensitive layer 11. There is also provided an image-carrying layer 12. Between the image-carrying layer 12 and the base layer 10 there is shown a container 13 adapted to have therein the liquid composition mentioned above. This container is preferably positioned at one end of the image-carrying layer, while at the other end thereof there is preferably provided a trap 14 adapted to receive and hold any excess of said liquid composition which is not used during the processing of said film. There is also shown a seal 15 adapted to seal the edges of the whole unit so that when container 13 is ruptured during processing and the liquid is spread between the base layer 10 and the image-carrying layer 12, it will be confined to the area therebetween and will not escape from the film unit.

Since it is quite possible that there may be a certain amount of air contained between the various layers of the film at the time that the container is ruptured and the liquid composition is spread between the layers, air pockets may be formed between these layers and thus interfere with the photographic reaction. It is possible, of course, to so design the composite film unit that there will be substantially no air between any of the layers. This can be accomplished by sealing the film unit in a partial vacuum with the various layers pressed closely together. Since this is a less preferred technique for mass producing such film units, it is desirable to provide a means for allowing any air contained in the film unit to be forced out by the liquid as it is spread between the layers. In this way, no air will be left to either oxidize the developer, to cause bubbles, or to force the layers apart after the liquid composition has been spread therebetween. In order to effect the release of the air, a portion of the seal 15 is made so as to permit the passage of air therethrough, while preventing the passage of the liquid composition. Thus, as this liquid composition is spread throughout the film unit, between the image-carrying layer and the photosensitive layer, it will force the air within the film ahead of it and the air will be forced through the air-permeable portion of the seal 15. The seal 15 can be made of a fibrous substance such as an air-permeable paper which is sufficiently permeable to allow the passage of air therethrough while retaining the liquid composition. It is desirable for the air-permeable portion of the seal 15 to be positioned at the end of the film unit opposite from the container end. It is possible for the trap 14 to serve as an air escape means if the seal 15 behind the trap is perforated. In this case, the trap prevents the passage of the liquid composition completely therethrough while permitting the air forced ahead of the liquid composition to pass through the trap and through the holes in the seal 15. It is also possible for the seal 15 to have therein very small holes which will permit air to escape but will be of such small diameter as to substantially prevent passage of the relatively viscous liquid composition. It is also possible to omit the seal 15 entirely from the end portion of the film unit containing the trap 14. In this case the trap is made so large, in relation to the amount of liquid composition used, that it will completely hold all of the liquid that could conceivably be left over from the photographic reaction, and therefore no liquid can get past the trap, while the air, of course, is free to escape from the unsealed end of the film unit.

The seal 15, throughout most of its area, can be made of air- and liquid-permeable substances such as cellophane, cellulosic film, wax paper, etc. A portion of the seal, however, preferably that portion adjacent the trap 14, should be made air-permeable in the manner discussed above.

In a preferred embodiment of the present invention the photosensitive layer 11 is somewhat smaller in size than the base layer 10. The area on the image-carrying layer adjacent said photosensitive layer is known as the image area. The photosensitive layer 11 obviously may be made of the same size as layer 10 without departing from the spirit of the present invention. In this latter case the image area would be a predetermined area on the image-carrying layer roughly corresponding to that portion of the photosensitive layer adapted to be exposed to actinic light, with preferably room for a frame around the positive image.

The base layer 10 is preferably made of a cellulosic film base such as cellulose acetate, cellulose nitrate, or cellulose acetate butyrate. The photosensitive layer 11 preferably comprises an emulsion of a silver halide or of a mixture of silver halides or of a mixed silver halide, although, as will be subsequently pointed out in more detail, other photosensitive materials and appropriate processing compositions therefor may be employed in the practice of the invention. The image-carrying layer 12 is preferably made of baryta paper, paper, hardened gelatin or some similar substance. It is preferably permeable to some of the liquids in the liquid composition but is not so permeable as to allow said liquids to escape therethrough. The liquid composition in the container 13 preferably comprises a developer such as hydroquinone when the photosensitive layer comprises silver halide, a film-forming substance such as sodium carboxymethyl cellulose and a substance adapted to form from a latent photosensitive image a positive image-forming component. This latter substance, in a preferred form of the invention, is sodium thiosulfate. There may also be included in this liquid composition other substances, such as a preservative and an alkali, and water to carry all of the above-named substances in solution. Container 13 is, in a preferred form of the invention, formed of a folded material having sealed ends, an impervious back and a sealed edge adjacent the image area, the seal between the edge being more easily separable than the seal between the ends, so that when pressure is applied to the container the liquid composition therein will be released unidirectionally from the edge and will spread onto the image area. This container may be made of a substance such as an oxygen- and water vapor-impervious material such, for example, as a sheet of wax impregnated metal coated paper, or wax coated metal foil.

In the use of the invention as described in Fig. 1, the photosensitive layer 11 is exposed to actinic light, as in a camera, the exposure being through the transparent base layer 10. The film unit is then run through pressure means such as a wringer, the container end of the film going first. As the film unit passes through the wringer, the container 13 will be ruptured and the liquid composition therein will be spread substantially unidirectionally between the photosensitive layer 11 and the image-carrying layer 12. As the fluid spreads between these two layers, it will form a dimensionally stable film, which is known as an image-receiving layer. The developer in the liquid composition will develop the latent image in the photosensitive layer and the substance, such as sodium thiosulfate, will form, with the unexposed silver halide, positive image-forming complexes which are transported from the photosensitive layer to the image-receiving layer where a positive image of the subject matter of the latent image is formed. After time has been allowed for the above-mentioned processes to take place, the base layer and the photosensitive layer may be stripped from the image-receiving layer to reveal the positive image.

In the process described above, the seal 15 confines the fluid composition substantially to the image area and the trap means. With the use of this seal, complete coverage is assured with liquid compositions of relatively low viscosity. It also prevents waste of any of the liquid composition, regardless of its viscosity. Since a portion of this seal, as explained above, permits the escape of air while retaining the liquid composition, it will allow all of the air to be forced out of the film unit, and the photographic reaction may take place without the interference of air bubbles or danger of oxidation of the developer. There also will be no possibility that entrapped air will force the various layers of the film unit apart.

The trap 14 may be formed in a number of ways, such as by providing a large pocket in the trapping end of the film unit or by forming a series of small pockets therein. It may also be formed of a porous material as shown in Fig. 1, such as felt, cotton or a like substance. It can be formed of a sponge or any other means that will hold the liquid forced thereinto by the pressure rollers.

Although it is preferred to use a liquid composition containing a film-forming material, this film-forming material forming a dimensionally stable film, known as the image-receiving layer, the present invention is not limited thereto. It is possible to practice the present invention by using a liquid composition which has no film-forming substance. If such were the case, and the container were ruptured, the liquid composition would be spread between the photosensitive layer 11 and the image-carrying layer 12. The developer would develop the latent image and the substance, such as sodium thiosulfate, would transfer the positive image-forming complexes from the photosensitive layer to and within the surface of the image-carrying layer 12. In this latter case, the positive image would be formed on and within the surface of the image-carrying layer 12.

It can thus be seen that the image-carrying layer 12 acts either as a support for a substance receiving the image or acts as a receiving layer for the image, depending upon whether or not a separate film-forming substance is contained in the liquid composition.

In the event that a liquid composition of low viscosity is utilized, it is apparent that the air escape means must be so designed as to permit the passage of air while still preventing the passage of the low viscosity liquid composition. For this purpose, it is preferable to use a very large trap which will insure the retention of all the liquid.

The film unit shown in Fig. 1 may be used as a separate one-picture unit or it may be part of a continuous roll of film. It is also possible to make this film unit into a film pack having a plurality of film units arranged therein and connected together by means of a connecting strip running from the trap end of one film unit to the container end of the next succeeding film unit.

Referring now to Fig. 2, there is shown another modification of the present invention wherein 20 is a base layer adapted to carry a photosensitive layer 21. There is also provided an image-carrying layer 22. Between one end of the base layer 20 and the image-carrying layer 22, there is positioned a container 23 for the liquid composition previously mentioned. As shown in Fig. 2, the photosensitive layer is preferably of a smaller area than is either the base layer 20 or the image-carrying layer 22. This preferred embodiment is not necessary, but is desired since it effects a saving in the amount of photosensitive emulsion required to make up a film unit. As in Fig. 1, there is also provided a trap 24 for the excess of the liquid composition which is not used up in the photographic reaction. As described in connection with Fig. 1, this trap is preferably made of a porous material such as blotting paper, although it may be constructed in accordance with any of the modifications mentioned in connection with the discussion of Fig. 1, i. e., it may be a series of pockets, a single pocket, a blotter surface, or a spongy material.

As can be seen from Fig. 2, the adjacent edges of the base layer 20 and the image-carrying layer 22 are pressed together to form a seal 25, completely surrounding the film unit on its ends and sides. This seal may be formed by heat and pressure such as would be possible if the base 20 and the image-carrying layer 22 were made of a thermoplastic composition, or a coating of a thermoplastic composition may be provided on one or the other, or both, of the adjacent edges of said two layers to form this seal under heat and pressure. The seal may also be formed by any other adhesive, such as a glue or synthetic resin which gives a bond having sufficient strength to resist the hydraulic pressure created within the film unit during processing. A preferred adhesive compound is a polyvinyl acetate (in solution) such as that known by the trade mark "Vinyl Seal," and made by the Bakelite Corporation under the designation of "Adhesive MA28–18."

As discussed in connection with Fig. 1, it is desirable that air escape means be provided in the composite film unit of Fig. 2. This may be accomplished by omitting a portion of sealing compound 25 immediately adjacent the trap 24 of Fig. 2. It is also possible to provide small holes in either the base layer 20 or the image-carrying layer 22, in that area between the end of the trap 24 and the end of the film unit. An alternative modification is to have a portion of the trap 24 extending completely through the seal 25. Since the trap 24 is preferably made of an air-permeable substance, the air will be forced through this portion of the trap and will consequently pass out through the seal.

In connection with Fig. 2, that portion of the image-carying layer 22 which is opposite the photosensitive layer 21 substantially defines the image area. As discussed in connection with Fig. 1, the image may be formed in an image-receiving layer on said image area. This image-receiving layer may be formed by a film-forming material contained in said liquid composition. The image may be equally formed on the image-carrying layer in those cases where the liquid composition does not contain a film-forming material. In this latter instance, the positive image-forming complexes would be transferred from the photosensitive layer directly to the image-carrying layer 22.

As described in connection with Fig. 1, the invention shown in Fig. 2 may be a portion of a continuous film strip having film units of the type shown in Fig. 2 connected in a series. It is equally possible for the film unit of Fig. 2 to be connected for arrangement in a film pack. In those cases where the invention of Fig. 2 is designed for use with a film pack, it is desirable that the overall thickness of the film unit be substantially the same throughout its area, or at least that the two ends thereof be of substantially the same thickness. If this were not the case, one end of a stack of these film units would be substantially thicker than the other end of a stack of the units. In order to accomplish this result, I have shown the trap means 24 as being of substantialy the same thickness as the container 23. The container 23 and the trap 24 are also preferably made with the same general amount of compressibility up to the rupture point of the container, so that, if these film units are stored in a film pack under pressure, both ends of the film unit will be compressed substantially the same amount, thus maintaining substantially the same thickness at both ends of the film unit.

I have shown in Fig. 2 the trap means 24 as preferably having a tapered edge on that side adjacent the image area. The reason for this is to allow the pressure means, such as the pressure rollers, to apply a uniform compression to the film unit throughout the total image area. This taper allows the rollers to pass from the vicinity of the image area to the trap without creating any unequal pressure at the end of the image area or forming any undesirable pools of liquid composition during the passage of the film unit through the pressure means.

In the use of the film unit shown in Fig. 2, it is processed in the same manner as described in connection with Fig. 1, that is, the film is run through a wringer, the container end going first. The pressure rollers in the wringer rupture the container and spread the liquid composition unidirectionally between the photosensitive layer 21 and the image-carrying layer 22, the excess of the liquid being trapped by the trap means 24. The developer contained in the liquid composition develops the latent photosensitive image, and the other substance, such as sodium thiosulfate, forms soluble complexes with the unexposed portions of the photosensitive layer and transfers these image-forming complexes to the formed image-receiving layer. This latter layer is formed by the film-forming substance contained in the liquid composition. The positive image is formed within this image-receiving layer.

As discussed in connection with Fig. 1, the air escape means which is provided through the seal 25 will permit substantially all of the air contained within the film unit to be expelled by the passage of the liquid composition through the film unit. The air escape means will also prevent the passage of any of the liquid composition therethrough.

In those cases where no film-forming substance is used, the sodium thiosulfate will transfer the image-forming complexes onto and within the surface of the image-carrying layer 22, and the positive image will be formed thereon and therein.

Referring now to the modification of the present invention shown in Fig. 3, there is provided a base layer 30 adapted to carry a photosensitive layer 31. There is also provided an image-carrying layer 32. As shown in this modification of the invention, the base layer 30, carrying the photosensitive layer 31, is hinged to the image-carrying layer 32. This is a preferred form where the base layer 30 is opaque and is adapted to be moved relative to the image-carrying layer 32 in a camera, so that the photosensitive layer 31 may be directly exposed to actinic light. If the base layer 30 is transparent, there is no need for the hinged connection, and the base layer 30 and the image-carrying layer may be substantially permanently joined together on their adjacent edges.

Mounted on the image-carrying layer 32 there is shown a container 33 for a liquid composition, and a seal 35. There is also shown on said image-carrying layer a trap 34 on the end of said image-carrying layer opposite from the container 33. The seal 35 may comprise a piece of gasket material such as felt, cork or asbestos, having upper and lower sealing surfaces, or it may comprise a long mound of a sealing compound. The trap 34 is shown in this modification as a snake-like member which may be formed of paper, felt, or of the same material as used in the seal 35. The trap 34 is adapted to trap the excess liquid composition within the pockets formed by its irregular shape, and also may trap the liquid composition within its body.

In connection with the removal of air from the film unit shown in Fig. 3, this problem is not important if the liquid composition is spread between the photosensitive layer and the image-carrying layer while the film unit is being sealed, since there will always be an open end ahead of the liquid composition which will allow the liquid composition to force the air out ahead of it. If, however, the film unit is sealed before the liquid composition is spread, some means should be provided for permitting escape of air. Such means can be any of those discussed in connection with Figs. 1 and 2 above, and it is preferable to have an air-permeable trap 34 since this simplifies the construction considerably.

In Fig. 3, I have shown the image area 36 of the image-carrying layer 32 as being a raised portion bounded on its two sides by the seal 35, on one end by the trap 34, and on the other end by the container 33. This image area 36 may be formed as an integral part of the image-carrying layer or it may comprise another sheet superimposed upon said image-carrying layer. If the latter situation be the case, the image area sheet 36 is preferably mounted on the image-carrying layer so that it may be readily removed therefrom. A non-hardening adhesive is used to hold the image area sheet to the image-carrying layer and a tab (not shown) is provided between the image area sheet 36 and the image-carrying layer 32 for aiding in the removal of this sheet 36 from the image-carrying layer 32.

In connection with Fig. 2, I mentioned that it was desirable to have the film unit with a substantially uniform thickness throughout, and I showed means for making the ends thereof of substantially the same thickness and having substantially the same compressibility up to the rupture point of the container. In Fig. 3, the film unit can be made to have, if desirable, substantially the same thickness throughout its area. This is provided by making the container 33 and the trap 34 with substantially the same thickness and compressibility up to the rupture point of the container. The seal 35 is made with substantially the same thickness as the combined thickness of the image area sheet and the photosensitive layer 31. If a viscous film-forming substance were used in the liquid composition, the thickness of the seal 35 would be increased to allow for the thickness of the finally desired formed film comprising the image-receiving layer. The seal 35 is preferably made as compressible as, or slightly more compressible than, the material of the photosensitive layer and the image area sheet, so that, when the film unit is run through the pressure rollers, the whole image area will be subjected to a uniform application of pressure. This feature of the invention is desirable in some cases but not essential.

It is obvious that the seal 35 and the trap 34 and even the container 33 could be attached to the photosensitive half of the film rather than to the image-carrying half of the film as shown in Fig. 3.

In the use of the film shown in Fig. 3, the photosensitive layer is exposed to actinic light and the film is run through a pressure means such as a wringer. If the photosensitive layer is exposed through the base layer 30, the film would have been sealed previously and the liquid composition is confined during processing to the area within the seal. If that surface of the photosensitive layer nearest the image area is exposed directly, as would be necessary if the base layer 30 were opaque, the base layer 30 is sealed to the image-carrying layer 32 either just before, or during, the processing of the film. This could be accomplished by providing an additional set of pressure rollers adapted to seal the adjacent edges of the base layer 30 and the image-carrying layer 32 prior to their entry into the pressure-applying rollers normally provided. It is, of course, obvious that other means such as a sealing frame could be provided within the camera for applying pressure to these edges to be sealed prior to the processing of the film.

In one form of the invention described in connection with Fig. 3 I prefer to make the image-carrying layer 32 of a substantially porous material such as blotting paper. In this instance, all of that portion of the image-carrying layer between the image area and the various seals would constitute an additional trapping means, since it would tend to trap the excess liquid composition on its surface and within its surface.

In that modification of Fig. 3 wherein the image-carrying layer 32 is made of a substantially porous material, it is apparent that no other means for permitting the escape of air need be provided, since the air will be forced through the porous image-carrying layer 32.

Mentioned as an object of the invention is the provision of a film unit having a portion which is adapted to carry a positive image and which is removable from said unit. Practices for carrying out this feature of the invention make use of an image area portion which is located within the confines of the image-carrying sheet and which employs severable means around the margins of said portion whereby to detachably secure the image area portion to the remainder of said sheet. Embodiments of image-carrying sheet by which this object of the invention may be achieved are illustrated in Figs. 4, 4A and 5.

Referring now to Fig. 4, there is shown another modification of the present invention. Fig. 4 is a partially schematic view of only the image-carrying layer. This image-carrying layer may be any of the image-carrying layers shown in Figs. 1, 2, and 3 above, and is referred to herein as image-carrying layer 42. This feature of the invention relates primarily to the separation of the positive image, contained on or within the image area, from the image-carrying layer. There is shown a severing means 47, which is adapted to cut the image-carrying layer on the boundaries of the image area and thus allow a separation of the two portions of the image-carrying layer. In the particular modification of the severing means shown, it comprises a thread-like member which is placed on or just within the upper surface of the image-carrying layer and has its two ends extend through said layer. This thread-like severing means 47 may be placed on the image area and may preferably be sealed thereto by an adhesive coating on the severing means. The two ends are run through the image-carrying layer 42 and extend from the bottom thereof. When these two ends are pulled, they will shear the image-carrying layer along a line defined by the initial position of the severing means, with the result that the image area may be readily removed from the image-carrying layer. This thread-like severing means may be formed of a fine metal wire having a high tensile strength, or may be formed of any other substance such as silk or nylon thread which will have sufficient high tensile strength with respect to the shear strength of the image-carrying layer to sever the image-carrying layer.

Figure 4A:
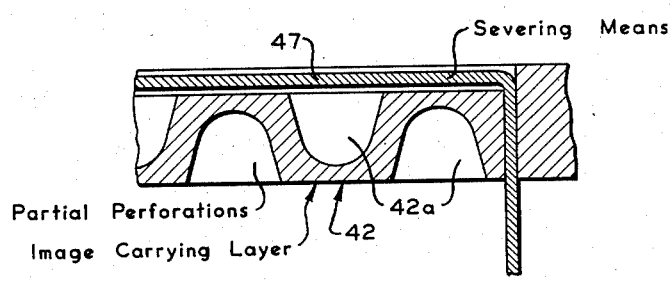
Fig. 4A is a partial sectional view of one modification of the invention shown in Fig. 4.

In Fig. 4A, I have shown a modification of the invention described in connection with Fig. 4. Fig. 4A shows a fragmentary sectional view of an image-carrying layer 42. In this embodiment of the invention, the image-carrying layer is recessed to accommodate the thread-like severing means 47. In a preferred embodiment the recess is filled with a plastic after the severing means has been inserted therein, to insure a smooth, uninterrupted surface for the image-carrying layer. In this modification of the invention, I have also shown partial perforations 42a in the image-carrying layer. The purpose of these partial perforations is to weaken that portion of the image-carrying layer adapted to be cut by the severing means 47. It is also apparent that the partial perforations 42a may be extended completely through the image-carrying layer, in which case it would be possible to dispense with the severing means 47. Since these perforations running completely through the image-carrying layer might allow the fluid composition to escape therethrough, I prefer not to allow these perforations to extend through the image-carrying layer, and I prefer to use a severing means in addition to the partial perforations.

Figure 5:
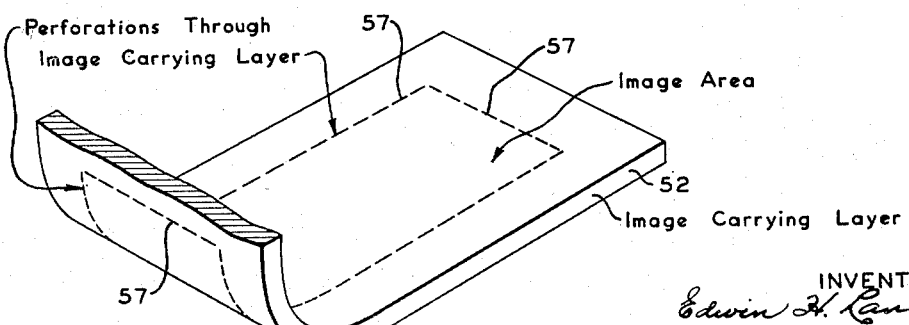
Fig. 5 is a schematic view of a portion of the image-carrying layer shown in Figs. 1, 2, and 3, embodying still another modification of the present invention.

A construction for an image-carrying sheet or layer wherein perforations extend completely therethrough is illustrated in Fig. 5. As shown in Fig. 5, the image-carrying layer 52 is provided with perforations 57 which extend entirely through the layer 52 and which surround an area lying within the confines of the sheet 52 and having dimensions corresponding to the dimensions possessed by the image area of the photosensitive layer employed in conjunction with the sheet 52. Removal of the image area is accomplished by tearing, breaking or severing the perforations 57.

In the products hereinbefore described, use is made of a container, such as one of the containers 13, 23 or 33, which holds a liquid capable of processing a photosensitive layer such as one of the layers 11, 21 or 31. As previously pointed out, in the preferred form of the products, the photosensitive layer is a silver halide emulsion or the like and the liquid released from the container associated therewith cooperates with the emulsion and with an image-carrying layer, such as one of the image-carrying layers 12, 22, 32, 42 or 52, to carry out a transfer process. When the photosensitive material is silver halide, the transfer process involves the development of a latent image in the emulsion and the removal from that emulsion of part at least of undeveloped silver halide as a soluble complex, which soluble complex is transported from the photosensitive layer to form the positive print. However, it will now be apparent that by so forming the products as to omit therefrom the substance for forming the soluble complex, it becomes possible to only develop the silver halide emulsion. It is believed to be also evident now that developable photosensitive materials other than silver halides may constitute the photosensitive layer 11, 21 or 31 which is processed and that the product may carry suitable developing agents and such other liquid as is necessary to render said agents operative to effect the development of the photosensitive layer.

Certain diazonium compounds are destroyed by light and photographic processes involving such compounds as their photographic materials have been used commercially. There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," Second Edition, published 1937 by Pitman Publishing Company, page 444, paragraph 693.)

The products of the present invention may be used in conjunction with or may comprise as elements thereof diazonium photosensitive layers. For example, in the product of Fig. 1 the photosensitive layer 11 may have as its photosensitive substance a diazonium compound such as that sold by the Boston Blue Print Company under the name "Blackline #202," and the liquid reagent in the container 13 then preferably comprises a mixture of sodium carboxymethyl cellulose, water and "Blackline" developer #203½ (sold by Boston Blue Print Company and manufactured by Frederick Post Company, Chicago). In the alternative, the photosensitive layer 11 may be obtained by applying to one side of a suitable sheet material a sensitizing solution which consists of 20 grams of chlorostannate of para-diazo-di-N-butyl-aniline, 0.4 gram of Pontacyl Brilliant Blue 2R, and 1 liter of water. The liquid developing reagent in the container 13 then preferably comprises, by weight, 4 parts of medium viscosity sodium carboxymethyl cellulose, 100 parts of water, 5.8 parts of sodium carbonate (monohydrate) and 2.3 parts of phloroglucinol.

It is also well known that certain ferric salts of organic acids, for example the oxalates, tartrates, and citrates, are reduced to ferrous salts when exposed to light. (L. P. Clerc, "Photography Theory and Practice," Second Edition, published 1937 by Pitman Publishing Company, page 402, paragraph 621 et seq.; Crowley Patents Nos. 2,093,421, 2,113,423, 2,130,070, 2,130,071, 2,137,015). A considerable number of photographic processes depend for their functioning on this photochemical phenomenon. It is known in connection with these iron salts that any reagent that will differentiate between ferric and ferrous salts can be used to develop the barely visible image formed by the photochemical reduction of the ferric salt into an image which is very easily visible. Examples of such developing reagents are potassium ferricyanide, potassium ferrocyanide, tannins, gallic acid, B-naphthoquinone-sulphonic acid, silver salts, platinum and palladium salts. It is believed to be now apparent to one skilled in the art that the photoresponsive ferrous salts may constitute the photosensitive material of the photosensitive layer 11, and the liquid in the container 13 may include or dissolve in its travel to the photosensitive layer any one of the aforementioned developing reagents for distinguishing between the ferric and ferrous salts and producing the easily visible image from the very light image that is originally obtained by the photoexposure of the iron salts.

Broadly, the products of the present invention may comprise, or may be used with, any photographic, photosensitive material for the purpose of developing the same. It is to be understood that the invention is not limited to materials sensitive to visible radiation but includes photographic, photosensitive materials sensitive to such other radiation as X-ray, ultraviolet or infrared. For example, the photosentitive unit of Fig. 1 may have layers 10 and 12 thereof oqaque to visible and near-visible radiation actinic to layer 11 so that the same may be handled in the daylight without having the photosensitive layer thereof photoexposed. Exposure of the photosensitive layer may be suitably accomplished by means of X-ray or gamma radiation. The resulting product is thus particularly suitable for use in the taking of X-ray pictures and may also be used for detecting and for giving, when processed, a visible indication of the extent of the presence of nuclear radiation, i. e., of radiation such as is associated with X-rays, radium, uranium and other natural or artificial radioactive materials, and particularly gamma radiation, beta radiation and neutron radiation. Photosensitive units of the latter type, suitable for detecting the presence of nuclear radiation, are disclosed in my copending application Serial No. 118,596, filed September 29, 1949, for "Radiation Detection Devices." The novel structures herein described may be suitably adapted for use in similar units.

The term "photographic developing reagent" as used herein is intended to include any reagent which acts to render a visible image more visible, as in the case of the ferric salts, or an invisible image visible, as in the case of the silver halide emulsions. The term "development" is intended to cover the treatment of any photographic, photosensitive material for the purpose of rendering an image formed therein by photoexposure visible or more visible. The photoexposure may, of course, be the result of exposure to any type of radiation actinic to the photosensitive material.

The term "thread" as used herein is intended to include any and all threadlike filaments such, for example, as spun cotton, flax, silk, wool, synthetic fibers, metal, and the like.

In the various figures of the drawings I have shown the components of the photographic material of the present invention as separate, distinct, and relatively thick layers. It should be understood that the relative thicknesses of these layers is shown only for illustrative purposes to clarify the invention. In actual practice some of these layers are extremely thin, even to the point of being difficult to measure with the naked eye.

Since certain changes may be made in the above product, and different embodiments of the invention could be made without departing from the scope thereof, it is intended that all matter contained in the above description or shown in the accompanying drawings shall be interpreted as illustrative and not in a limiting sense.

What is claimed is:

1. A photographic product containing a photographic reagent and comprising a first liquid-confining layer constituting a photographic element having a photosensitive portion which is capable of having an image formed in a predetermined area thereof upon photoexposure, a second liquid-confining layer, a rupturable container holding a liquid, said layers being attached together transversely thereof adjacent one end of one of said layers to permit said layers to be separated for exposure of said area and then superposed with said liquid held by said container so as not to wet said layers and with said container being adjacent said end for releasing said liquid between said layers, and sealing material extending along the longitudinal margins of one of said layers in a position to form a seal with the longitudinal margins of said other layer upon superposition of said layers so as to prevent leakage of said liquid from the longitudinal edges of said product when said liquid is released from said container an spread, under pressure, lengthwise of said product between said layers, at least one of said two liquid-confining layers being sufficiently flexible and deformable to permit a concentrated pressure applied to the outer surfaces of said product to be transmitted through said flexible layer to rupture the seal of said container and to discharge the liquid content of the container over said photosensitive element, said photosensitive portion comprising as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said liquid, upon permeation of said photosensitive element, rendering said photographic reagent effective to produce a chemical transformation in said photosensitive element.

2. In a photographic product as defined in claim 1, an image-carrying portion which lies within the marginal edges of said second liquid-confining layer and which corresponds in area to the image area provided by said photosensitive portion of said first liquid-confining layer, and means connecting the margins of said image-carrying portion to said second liquid-confining layer whereby said image-carrying portion forms a part of the second liquid-confining layer, said last-mentioned means being readily rendible whereby said image-carrying portion is separable as a unit by rending said connecting means.

3. The product of claim 1 wherein said second liquid-confining layer includes means defining the edges of an area corresponding to said predetermined image area of said first liquid-confining layer, said means comprising severing means constituting a thread having a tensile strength high with respect to the shear strength of said second liquid-confining layer.

4. A photographic product containing material, including a photographic reagent, for producing a transformation of an image in said product, said reagent being present in an amount sufficient to effect said transformation, said product comprising a first elongated liquid-confining layer constituting a photographic element having a photosensitive portion which is capable of having an image formed in a predetermined area thereof upon photoexposure, said photosensitive portion comprising a sheet of smaller area than said first liquid-confining layer, a second elongated liquid-confining layer, a rupturable container holding a liquid, said liquid being in the amount required for transforming said image in said photosensitive portion, said liquid, upon permeation of said photosensitive portion, rendering said transforming material effective to transform said image, said layers being attached together transversely thereof adjacent one end of one of said layers to permit said layers to be separated for exposure of said area and then superposed with said liquid held by said container so as not to wet said layers and with said container being positioned adjacent said end for releasing said liquid between said layers, and sealing material extending along the longitudinal margins of one of said layers in position to form a seal with the longitudinal margins of said other layer upon superposition of said layers so as to prevent leakage of said liquid from the longitudinal edges of said product when said liquid is released from said container and spread, under pressure, lengthwise of said product between said layers, said sealing material comprising strips having adhesive surfaces, said strips of sealing material having a thickness at least as great as the thickness of said sheet, said strips of sealing material being arranged so as to be spaced from the longitudinal edges of said sheet, said container being secured to one of said liquid-confining layers adjacent one transverse edge of said sheet, at least one of said two liquid-confining layers being sufficiently flexible and deformable to permit a concentrated pressure applied to outer surfaces of said product to be transmitted through said flexible layer to rupture said container and spread, by means of said concentrated pressure, said liquid in a substantially uniform layer across said area.

5. The product of claim 1 wherein said photosensitive portion comprises a silver halide and said reagent comprises a silver halide developer.

6. A photographic product containing material, including a photographic reagent, for developing an image in said product, said reagent comprising a silver halide developer and being present in an amount sufficient to effect said development, said product comprising a first substantially rectangular liquid-confining layer, including at least a silver halide, photosensitive portion capable of having an image formed in a predetermined area thereof upon photoexposure, a second substantially rectangular liquid-confining layer, a rupturable container holding a liquid, said liquid being in the amount required for developing said image in said photosensitive portion, said liquid, upon permeation of said photosensitive portion, rendering said material effective to develop said image, said layers being superposed with said liquid held by said container so as not to wet said layers and with said container being positioned adjacent one edge of said superposed layers for releasing said liquid between said layers adjacent an edge of said area, and an adhesive uniting the other three edges of said layers and forming a liquid-tight seal with said other three edges to prevent any of said liquid from escaping from said product when said liquid is released and spread under pressure across said area, at least one of said two liquid-confining layers being sufficiently flexible and deformable to permit a concentrated pressure applied to outer surfaces of said product to be transmitted through said flexible layer to rupture said container and spread, by means of said concentrated pressure, said liquid in a substantially uniform layer across said area.

7. The product of claim 6 wherein said product includes a portion of said seal, adjacent an edge of said area opposite from said container, which is permeable to air and substantially impermeable to said liquid.

8. The product of claim 6 wherein said second liquid-confining layer includes an image area which is smaller in area than said second layer, the edges of said image area being defined by means comprising a severing means and constituting a thread having a tensile strength high with respect to the shear strength of said second liquid-confining layer.

9. The product of claim 6 wherein said second liquid-confining layer includes an image area which is smaller in area than said second layer, the edges of said image area being defined by means comprising a severing means and constituting a thread having a tensile strength high with respect to the shear strength of said second liquid-confining layer, said second liquid-confining layer being weakened at the edges of said image area to lower the shear strength thereof.

10. A photographic product containing material, including a photographic reagent, for developing an image in said product, said reagent comprising a silver halide developer and being present in an amount sufficient to effect said development, said product comprising a first elongated liquid-confining layer, including a silver halide photosensitive portion capable of having a latent image formed in a predetermined area thereof upon photoexposure, a second elongated liquid-confining layer, a rupturable container holding a viscous liquid, said liquid being in the amount required for developing said image in said photosensitive portion, said liquid, upon permeation of said photosensitive portion, rendering said developer effective to develop said image, said layers being superposed with said liquid held by said container so as not to wet said layers and with said container being positioned adjacent one end of said superposed layers for releasing said liquid between said layers adjacent an edge of said area, and an adhesive uniting the longitudinal edges of said layers and forming a liquid-tight seal with said longitudinal edges to prevent any of said liquid from escaping from said product when said liquid is released and spread under pressure across said area, at least one of said two liquid-confining layers being flexible and deformable to permit a concentrated pressure applied to outer surfaces of said product to be transmitted through said flexible layer to rupture said container and spread, by means of said concentrated pressure, said liquid in a substantially uniform layer across said area.

11. The product of claim 10 wherein the two ends of said product have substantially the same thickness and compressibility up to the rupture point of the container.

12. A photographic product containing material, including a photographic reagent, for developing an image in said product, said reagent comprising a silver halide developer and being present in an amount sufficient to effect said development, said product comprising a first liquid-confining layer, including a silver halide photosensitive portion capable of having a latent image formed in a predetermined area thereof upon photoexposure, a second liquid-confining layer, a rupturable container holding a liquid, said liquid being in the amount required for developing said image in said photosensitive portion, said liquid, upon permeation of said photosensitive portion, rendering said developer effective to develop said image, said layers being superposed with said liquid held by said container so as not to wet said layers and with said container being positioned adjacent one edge of said area for releasing said liquid between said layers adjacent an edge of said area, and an adhesive uniting all of the edges of said layers and forming a liquid-tight seal with said edges to prevent any of said liquid from escaping from said product when said liquid is released and spread under pressure across said area, at least one of said two liquid-confining layers being flexible and deformable to permit a concentrated pressure applied to outer surfaces of said product to be transmitted through said flexible layer to rupture said container and spread, by means of said concentrated pressure, said liquid in a substantially uniform layer across said area.

13. A photographic product containing material, including a photographic reagent, for developing an image in said product, said reagent comprising a silver halide developer and being present in an amount sufficient to effect said development, said product comprising a first liquid-confining layer, including a silver halide photosensitive portion capable of having a latent image formed in a predetermined image area thereof upon photoexposure, a second liquid-confining layer, a rupturable container holding a liquid, said liquid being in the amount required for developing said image in said photosensitive portion, said liquid, upon permeation of said photosensitive portion, rendering said developer effective to develop said image, said layers being superposed with said liquid held by said container so as not to wet said layers and with said container being positioned adjacent one edge of said area for releasing said liquid between said layers adjacent an edge of said area, an adhesive uniting the longitudinal edges of said layers and forming a liquid-tight seal with said edges to prevent any of said liquid from escaping from said product when said liquid is released and spread under pressure across said area, and said second liquid-confining layer being provided with a removable portion which is located within the marginal edges of said second liquid-confining layer and which corresponds in area to the image area of said first liquid-confining layer, at least one of said two liquid-confining layers being flexible and deformable to permit a concentrated pressure applied to outer surfaces of said product to be transmitted through said flexible layer to rupture said container and spread, by means of said concentrated pressure, said liquid in a substantially uniform layer across said photosensitive area and said removable portion.

14. A product containing a silver halide developer and capable of developing a photosensitive silver halide element, said product comprising an elongated, rupturable container holding an aqueous dispersion of an organic film-forming colloid and a sheet support upon which said container is mounted, portions of the walls of said container being secured together in face-to-face relation to provide a liquid-dispensing lip extending substantially the length of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the spreading lip and at least as wide as the length of said lip onto which said container contents are spreadable from said dispensing lip, a portion of said sheet support lying within the margins of said support providing a tear-out portion severable from said sheet support and having a face which is a part of said spreading surface and which provides an image area, and means detachably connecting the margins of said tear-out portion to said sheet support, said connecting means being readily rendible whereby said tear-out portion is separable as a unit from said sheet support for rending said connecting means, said image area being substantially greater than the container area, said aqueous dispersion being sufficient in amount to be spread on said image area and to provide said image area with a solid film of said organic colloid, the silver halide developer in said product being rendered effective on said area upon the spreading of said dispersion.

15. A product containing a silver halide developer and capable of developing a photosensitive silver halide element, said product comprising an elongated, rupturable container holding an aqueous dispersion of an organic film-forming colloid and a sheet support upon which said container is mounted, portions of the walls of said container being secured together in face-to-face relation to provide a liquid-dispensing lip extending substantially the length of the container, the material of the container walls being stronger than the seal of the dispensing lip and said walls being at least in part deformable and flexible for transmitting to the container contents externally applied pressure of sufficient magnitude to open said lip, said sheet support providing a spreading surface extending substantially perpendicularly from the spreading lip and at least as wide as the length of said lip onto which said container contents are spreadable from said dispensing lip, an image area on said surface which is smaller in area than said surface, the edges of said image area being defined by means comprising severing means and constituting a thread having a tensile strength high with respect to the shear strength of said sheet support for assisting in separating said area from the remainder of said sheet, said image area being substantially greater than the container area, said aqueous dispersion being sufficient in amount to be spread on said image area and to provide said image area with a solid film of said organic colloid, the silver halide developer in said product being rendered effective on said area upon the spreading of said dispersion.

16. The product of claim 15 wherein said product includes strips of sealing material extending along the marginal edges of said image area, said sealing material being arranged to seal the edges of said product to a photosensitive element.

17. A photographic product comprising a sheet support, a rupturable container holding a liquid, said container being mounted on one side of said sheet support and extending transversely thereof, said support being provided on said side having said container thereon with a surface area which is coextensive with the width of said support and which is adapted to receive the liquid content of the container upon rupture thereof and the spreading of the liquid release therefrom, said container also being positioned on said sheet support in facing relation to an edge of said surface area for dispensing the liquid content of the container for spreading over said surface area, a portion of said sheet support which lies within the margins of said support and the margins of said surface area providing a tear-out portion severable from said sheet support and having a face which is a part of said surface area and which provides an image area, means detachably connecting the margins of said tear-out portion to said sheet support, said connecting means being readily rendible whereby said tear-out portion is separable as a unit from said sheet support by rending said connecting means, said container holding liquid in an amount sufficient to cover said surface area, said product containing a reducing agent for developing the exposed portion of a photosensitive element having as its photosensitive material a heavy metal salt capable of forming a latent image upon photoexposure and capable of being developed by said reducing agent to produce a visible image comprising the metal of said salt, said reducing agent being in an amount sufficient to develop an image in an area of said photosensitive element equivalent to said surface area of said sheet support, the content of said container, when spread on said surface area, placing said reducing agent in condition to effect the development.

18. A photographic product as defined in claim 17 wherein the margins of said tear-out portion are defined by severing means constituting a thread having a tensile strength high with respect to the shear strength of said sheet support for assisting in separating said tear-out portion from the remainder of said support.

19. A photographic product of the character set forth in claim 17 wherein said sheet support is provided with a plurality of perforations which extend therethrough and which surround and define the margins of said tear-out portion.

20. A photographic product containing a photographic reagent and comprising a first liquid-confining layer, a second liquid-confining layer, a photosensitive element, a rupturable container holding a liquid, said layers being superposed with said photosensitive element positioned therebetween and with said container adjacent one edge of said photosensitive element so as to be capable of releasing its liquid content between said layers in the direction of said photosensitive element, said liquid being held by said container so as not to wet said photosensitive element, and an adhesive means for uniting together edges of said liquid-confining layers to form a liquid-tight seal for preventing the liquid from escaping from said product when said liquid is released from its container, at least one of said two liquid-confining layers being sufficiently flexible and deformable to permit a concentrated pressure applied to the outer surfaces of said product to be transmitted through said flexible layer to rupture the seal of said container and to discharge the liquid content of the container over said photosensitive element, said photosensitive element comprising as its photosensitive material a salt from the class consisting of (a) the photosensitive ferric salts, (b) the photosensitive diazonium salts, and (c) heavy metal salts capable of forming a latent image upon photoexposure and capable of development to produce a visible image comprising the metal of said salt, said liquid, upon permeation of said photosensitive element, rendering said photographic reagent effective to produce a chemical transformation in said photosensitive element.

21. The product of claim 20 wherein the photosensitive element is a silver halide emulsion and the photographic reagent is a silver halide developer.

22. The product of claim 21 wherein said silver halide developer is contained in solution in the liquid in said rupturable container.

23. A photographic product comprising a first liquid-confining layer, a silver halide element, a second liquid-confining layer, a silver halide developer in an amount sufficient to develop a latent image in said element, a rupturable container holding a liquid, said layers being superposed with said element held therebetween and with said container adjacent one end of said superposed layers for releasing said liquid between said layers for permeating said element, said liquid, upon permeation of said element, rendering said developer effective to develop the exposed silver halide of said element, and adhesive means uniting edges of said layers and forming a liquid-tight seal with said edges to prevent any of said liquid from escaping from said product when said liquid is released from said container between said layers to permeate said element, at least one of said two liquid-confining layers being flexible and deformable to permit a concentrated pressure applied to outer surfaces of said product to be transmitted through said flexible layer to rupture said container and distribute said liquid in the direction of said element.

24. The product of claim 23 wherein said silver halide developer is contained in the liquid in the rupturable container.

EDWIN H. LAND.

REFERENCES CITED

The following references are of record in the file of this patent:

UNITED STATES PATENTS

| Number | Name | Date |
|---|---|---|
| 447,121 | Stecher | Feb. 24, 1891 |
| 693,536 | Baker | Feb. 18, 1902 |
| 2,147,384 | Salfisberg | Feb. 14, 1939 |
| 2,319,560 | Salfisberg | May 18, 1943 |
| 2,347,640 | Peters | May 2, 1944 |
| 2,360,597 | Topolski | Oct. 17, 1944 |
| 2,365,556 | Karg | Dec. 19, 1944 |

FOREIGN PATENTS

| Number | Country | Date |
|---|---|---|
| 393,813 | Great Britain | June 15, 1933 |